(12) United States Patent
Lee

(10) Patent No.: US 7,952,677 B2
(45) Date of Patent: May 31, 2011

(54) ARRAY SUBSTRATE FOR IN-PLANE SWITCHING MODE LIQUID CRYSTAL DISPLAY DEVICE AND METHOD OF FABRICATING THE SAME

(75) Inventor: Young-Hun Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 363 days.

(21) Appl. No.: 12/318,046

(22) Filed: Dec. 19, 2008

(65) Prior Publication Data
US 2010/0033664 A1    Feb. 11, 2010

(30) Foreign Application Priority Data

Aug. 7, 2008    (KR) .................. 10-2008-0077570

(51) Int. Cl.
*G02F 1/1345*    (2006.01)
*G02F 1/1343*    (2006.01)
(52) U.S. Cl. ......... 349/152; 349/139; 349/141; 349/150
(58) Field of Classification Search .................... 349/152
See application file for complete search history.

(56) References Cited

U.S. PATENT DOCUMENTS

| 7,619,710 B2* | 11/2009 | Nishida et al. | ................ | 349/141 |
| 7,859,628 B2* | 12/2010 | Park et al. | ..................... | 349/141 |
| 2003/0002000 A1* | 1/2003 | Watanabe | ..................... | 349/141 |
| 2008/0094559 A1* | 4/2008 | Lee et al. | ..................... | 349/143 |

* cited by examiner

*Primary Examiner* — Rhonda S Peace
(74) *Attorney, Agent, or Firm* — Morgan, Lewis & Bockius LLP

(57) ABSTRACT

An array substrate for an in-plane switching mode liquid crystal display device includes a plurality of gate lines on a substrate including a display region and a non-display region at a periphery of the display region; a plurality of common lines in the display region and parallel to the gate line, an end of each of the common lines disposed in the non-display region; a plurality of gate link lines each connected to an end of each of the gate lines and disposed in the non-display region; a gate insulating layer on the gate lines, the common lines and the gate link lines; a plurality of data lines on the gate insulating layer and crossing the gate lines to define a plurality of pixel regions in the display region; a first auxiliary common line on the gate insulating layer and in the non-display region, the first auxiliary common line crossing the gate link lines; a passivation layer on the data lines and the first auxiliary common line, the passivation layer including a first contact hole exposing the end of each of the common lines and a second contact hole exposing a portion of the first auxiliary common line; and a second auxiliary common line on the passivation layer and overlapping the first auxiliary common line, the second auxiliary common line electrically connected to the first auxiliary common line through the second contact hole and each of the common lines though the first contact hole, wherein the second auxiliary common line has substantially the same shape as the first auxiliary common line.

20 Claims, 8 Drawing Sheets

ARRAY SUBSTRATE FOR IN-PLANE SWITCHING MODE LIQUID CRYSTAL DISPLAY DEVICE AND METHOD OF FABRICATING THE SAME

The present invention claims the benefit of Korean Patent Application No. 10-2008-0077570 filed in Korea on Aug. 7, 2008, which is hereby incorporated by reference.

BACKGROUND OF THE INVENTION

1. Field of the Invention

The invention relates to a liquid crystal display (LCD) device, and more particularly, to an array substrate for an in-plane switching (IPS) mode LCD device resolving a contact problem in a gate pad region and a method of fabricating the array substrate.

2. Discussion of the Related Art

Recently, as the society has entered in earnest upon an information age, there is a requirement in properties of a thin profile, light weight and low power consumption for a flat panel display.

The flat panel display device is classified into an emission type and a non-emission type depending on whether the flat panel display device emits light or not. Since the emission type flat panel display device emits light, the emission type flat panel display device dose not require an additional light source. However, since the non-emission type flat panel display device does not emits light, the non-emission type flat panel display device requires an additional light source. For example, the emission type flat panel display device includes a plasma display device, a field emission display and an electro luminance display device, while the non-emission type flat panel display device includes an LCD device.

Among these devices, LCD devices are widely used for notebook computers, monitors, TV, and so on, because of their high contrast ratio and characteristics adequate to display moving images and color images.

The LCD device includes first and second substrates and a liquid crystal layer interposed therebetween. Electrodes are formed on each of the first and second substrates. The first and second substrates face each other, and the liquid crystal layer is positioned between the electrodes. The liquid crystal layer is driven by an electric field induced between the electrodes on the first and second substrates such that the alignment of the liquid crystal molecules changes. As a result, images can be displayed by controlling light transmissivity.

A liquid crystal panel for the LCD device is fabricated through a step of forming an array substrate, a step of forming a color filter substrate, a step of injecting a liquid crystal layer and a step of attaching the substrates. For example, a pixel electrode and a thin film transistor (TFT) as a switching element are formed in the array substrate. A common electrode and a color filter layer including red, green and blue colors are formed in the color filter substrate.

FIG. 1 is a schematic plan view of an array substrate for an IPS mode LCD device according to the related art. FIG. 2 is a cross-sectional view taken along the line II-II of FIG. 1. FIG. 3 is a cross-sectional view taken along the line III-III of FIG. 1.

In FIG. 1, a plurality of gate lines 10 along a first direction are formed in a display region AA, where images are displayed, of the array substrate 1 for the IPS mode LCD device. A plurality of data lines 40 along a second direction are formed in the display region AA. The gate line 10 crosses the data line 40 such that a pixel region P is defined. A plurality of common lines 18 are formed to be parallel to the gate line 10. The common line 18 runs across the pixel region P. A thin film transistor (TFT) Tr as a switching element is formed in each pixel region P. The TFT Tr is connected to the gate and data lines 10 and 40. A pixel electrode 80 having a plurality of bars is disposed in the pixel region P. The pixel electrode 80 is connected to a drain electrode 55 of the TFT Tr. A common electrode 20 having a plurality of bars is disposed in the pixel region P and connected to the common line 18. The bars of the common electrode 20 are alternately arranged with the bars of the pixel electrode 80.

A plurality of gate pad electrodes 22 and a plurality of data pad electrodes 45 are formed in a non-display region NA at a periphery of the display region AA. The gate pad electrodes and the data pad electrodes 45 are connected to an external driving circuit (not shown). In addition, a gate link line 13 for connecting the gate line 10 to the gate pad electrode 22 and a data link line 42 for connecting the data line 40 to the data pad electrode 45 are formed. The common line 18 extends into the non-display region NA. An end of the data line 40 is electrically connected to an auxiliary common line 50 through a connection pattern 83. The auxiliary common line 50 is parallel to the data line 40.

Referring to FIGS. 2 and 3 respectively showing a cross-sectional view of connection portions of the common line 18 and the auxiliary common line 50, the common line 18 is formed a the substrate 1, and the auxiliary common line 50 is formed on a gate insulating layer 22 on the common line 18. A passivation layer 60 is formed on the auxiliary common line 50. A first contact hole 64 exposing the common line 18 is formed through the passivation layer 60 and the gate insulating layer 22, and a second contact hole 66 exposing the auxiliary common line 50 is formed through the passivation layer 60. The connection pattern 83 is connected to common line 18 through the first contact hole 64 and the auxiliary common line 50 through the second contact hole 66 such that the common line 18 is electrically connected to the auxiliary common line 50 through the connection pattern 83. The auxiliary common line 50 crosses the gate link line 13 which is connected to the gat pad electrode 22 (of FIG. 1). The gate link line 13 is formed at the same layer as the gate line 10 (of FIG. 1) and the common line 18. Accordingly, to prevent an electrical short between the auxiliary common line 50 and the gate link line 13, the auxiliary common line 50 is formed at a different layer than the common line 18.

However, when the auxiliary common line 50 is formed on the passivation layer 60 and in the first and second contact holes 64 and 66, there is a contact problem or an opening problem in the array substrate 1 for the IPS mode LCD device because of a step difference by the first and second contact holes 64 and 66 and an aligning deviation.

Moreover, since there are requirements for increasing an area of the display region AA and decreasing an area of the non-display region NA, decreasing a width of the auxiliary common line 50 is also required. In this case, there is a difference in a resistance at one end and the other end of the auxiliary common line 50. As a result, there is a difference in a common voltage applied to the common electrode 20 according to their position such that a displaying image quality is deteriorated.

SUMMARY OF THE INVENTION

Accordingly, embodiments of the invention are directed to an array substrate for an in-plane switching (IPS) mode LCD device and a method of fabricating the same that substantially obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, an array substrate for an in-plane switching mode liquid crystal display device includes a plurality of gate lines on a substrate including a display region and a non-display region at a periphery of the display region; a plurality of common lines in the display region and parallel to the gate line, an end of each of the common lines disposed in the non-display region; a plurality of gate link lines each connected to an end of each of the gate lines and disposed in the non-display region; a gate insulating layer on the gate lines, the common lines and the gate link lines; a plurality of data lines on the gate insulating layer and crossing the gate lines to define a plurality of pixel regions in the display region; a first auxiliary common line on the gate insulating layer and in the non-display region, the first auxiliary common line crossing the gate link lines; a passivation layer on the data lines and the first auxiliary common line, the passivation layer including a first contact hole exposing the end of each of the common lines and a second contact hole exposing a portion of the first auxiliary common line; and a second auxiliary common line on the passivation layer and overlapping the first auxiliary common line, the second auxiliary common line electrically connected to the first auxiliary common line through the second contact hole and each of the common lines though the first contact hole, wherein the second auxiliary common line has substantially the same shape as the first auxiliary common line.

In another aspect, a method of fabricating an array substrate for an in-plane switching mode liquid crystal display device includes forming a plurality of gate lines, a plurality of common lines and a plurality of gate link lines on a substrate including a display region and a non-display region at a periphery of the display region, the plurality of common lines in the display region and parallel to the gate line, an end of each of the common lines disposed in the non-display region, the plurality of gate link lines each connected to an end of each of the gate lines and disposed in the non-display region; forming a gate insulating layer on the gate lines, the common lines and the gate link lines; forming a plurality of data lines and a first auxiliary common line on the gate insulating layer, the data lines crossing the gate lines to define a plurality of pixel regions in the display region, the first auxiliary common line in the non-display region and the first auxiliary common line crossing the gate link lines; forming a passivation layer on the data lines and the first auxiliary common line, the passivation layer including a first contact hole exposing the end of each of the common lines and a second contact hole exposing a portion of the first auxiliary common line; and forming a second auxiliary common line on the passivation layer and overlapping the first auxiliary common line, the second auxiliary common line electrically connected to the first auxiliary common line through the second contact hole and each of the common lines though the first contact hole, wherein the second auxiliary common line has substantially the same shape as the first auxiliary common line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF EXEMPLARY EMBODIMENTS

Reference will now be made in detail to exemplary embodiments of the invention, which are illustrated in the accompanying drawings.

Figure 1:
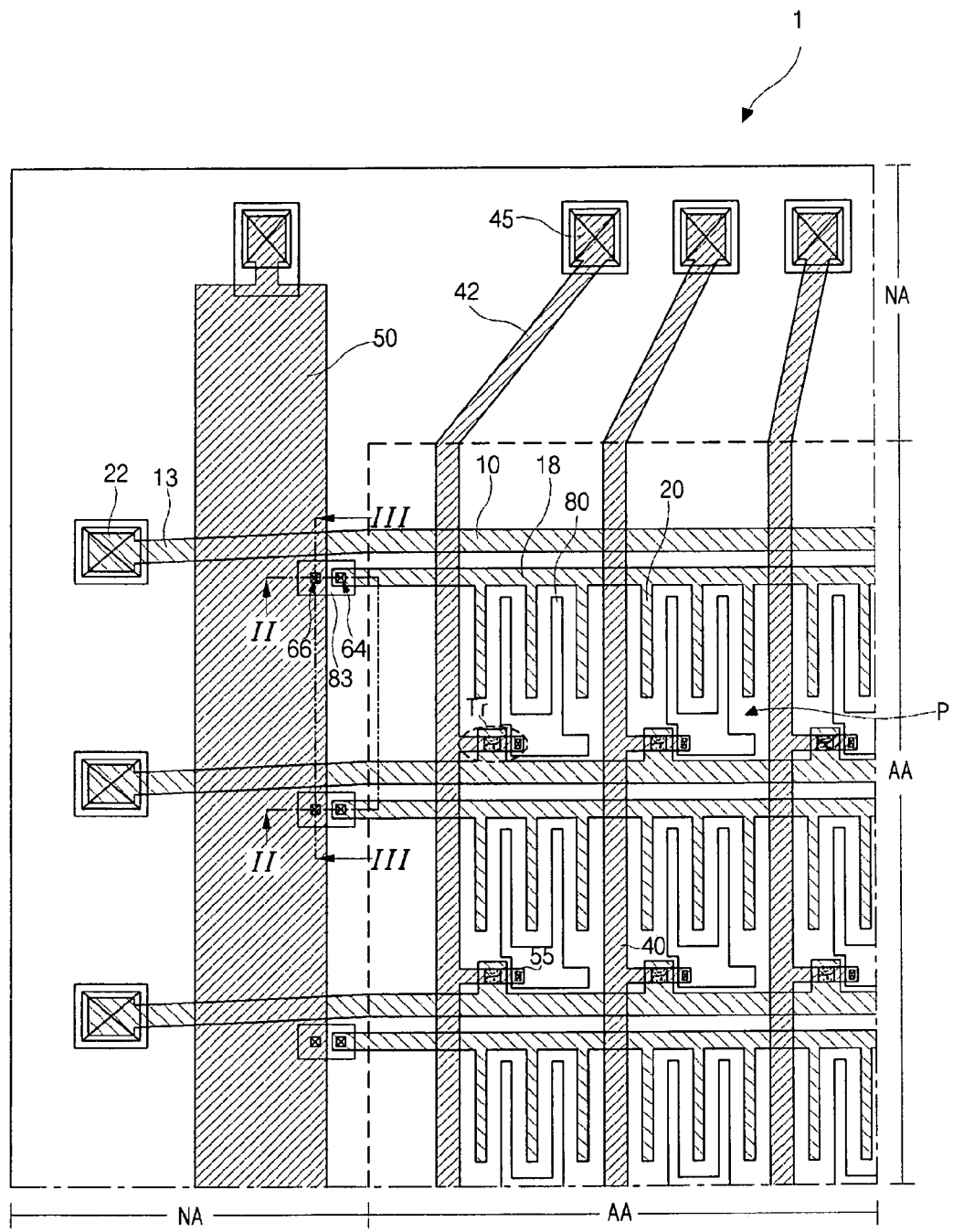
FIG. 1 is a schematic plan view of an array substrate for an IPS mode LCD device according to the related art.
Figure 2:
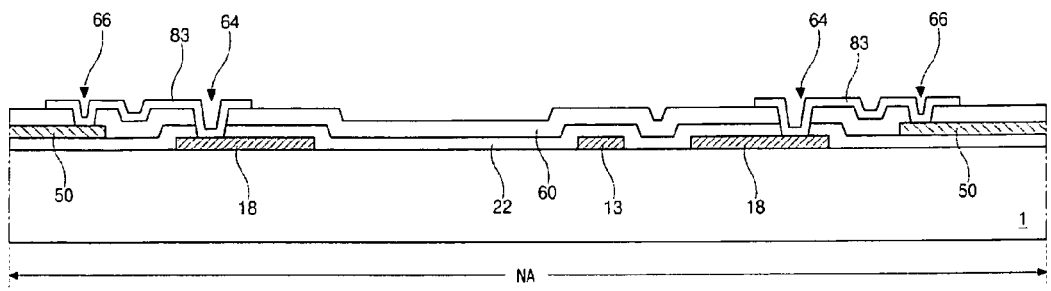
FIG. 2 is a cross-sectional view taken along the line II-II of FIG. 1.
Figure 3:
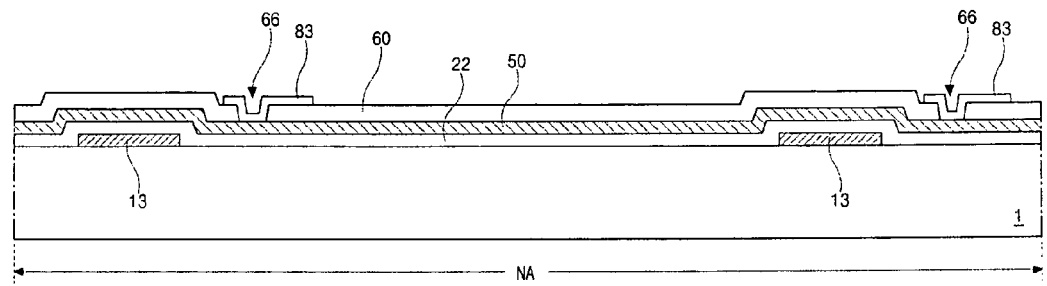
FIG. 3 is a cross-sectional view taken along the line III-III of FIG. 1.
Figure 4:
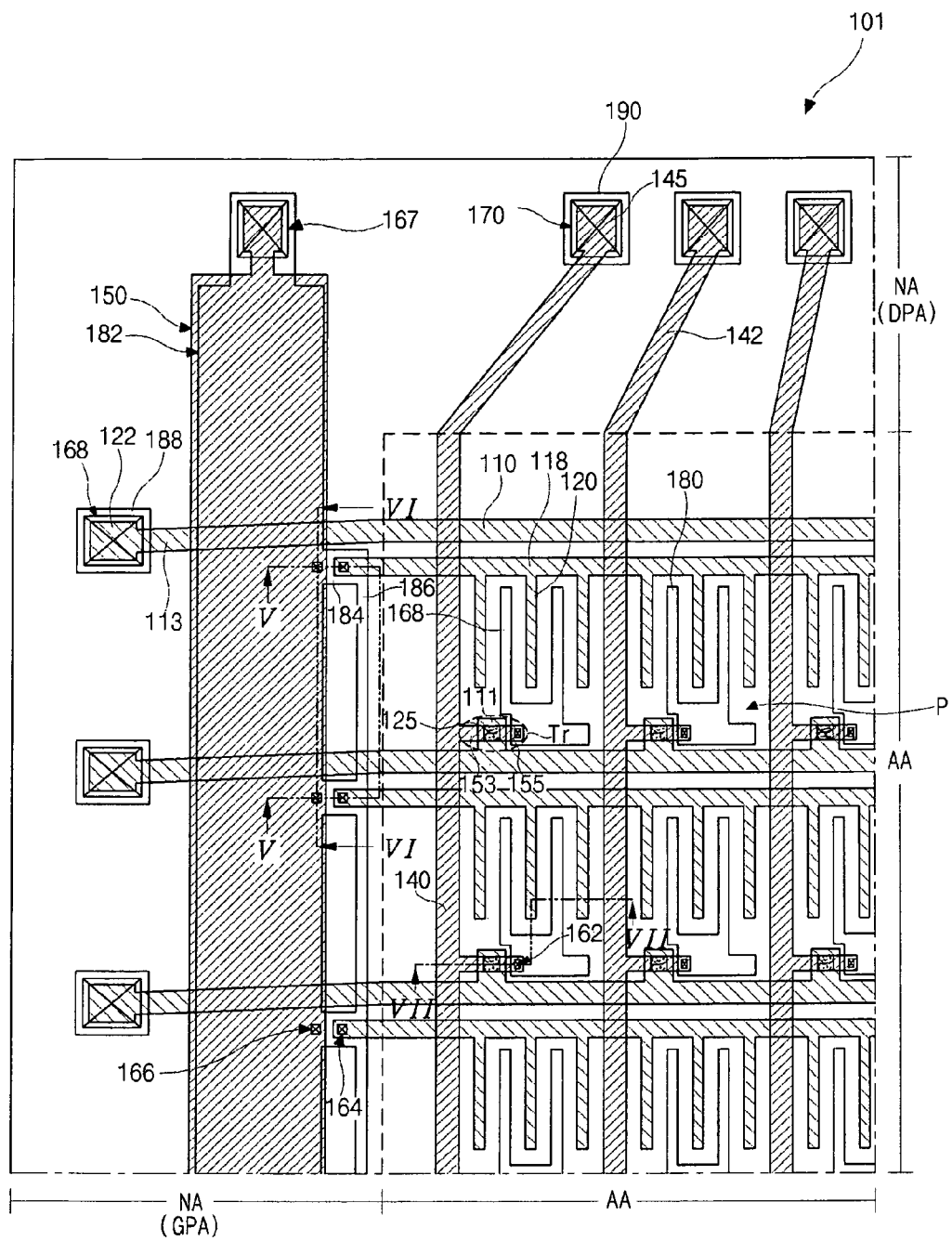
FIG. 4 is a schematic plan view of an array substrate for an IPS mode LCD device according to the present invention.

FIG. 4 is a schematic plan view of an array substrate for an IPS mode LCD device according to the present invention. In FIG. 4, a display region AA, where images are displayed, and a non-display region NA are defined in an array substrate 101. In the display region AA, gate and data lines 110 and 140 are formed. The gate and data lines 110 and 140 cross each other such that a pixel region P is defined. A common line 118 is formed to be parallel to the gate line 110. A thin film transistor (TFT) Tr connected to the gate and data lines 110 and 140 is formed in each pixel region P. The TFT Tr includes a gate electrode 111, gate insulating layer (not shown), a semiconductor layer 125 including an active layer (not shown) and an ohmic contact layer (not shown), a source electrode 153 and a drain electrode 155. In addition, a pixel electrode 180 connected to the drain electrode 155 of the TFT Tr through a drain contact hole 162 is formed in each pixel region P. The pixel electrode 180 includes a plurality of bars. A common electrode 120 having a plurality of bars is disposed in the pixel region P and connected to the common line 118. The bars of the common electrode 120 are alternately arranged with the bars of the pixel electrode 180.

A gate pad electrode 122 is formed in a gate pad region GPA defined in the non-display region NA. A data pad electrode 145 is formed in a data pad region DPA defined in the non-display region NA. The gate pad electrode 122 and the data pad electrode 145 are connected to an external driving circuit (not shown). In the data pad region DPA, a data link line 142 for connecting the data line 140 to the data pad electrode 145. In the gate pad region GPA, a gate link line 113 for connecting the gate line 110 to the gate pad electrode 122.

A first auxiliary common line 150 and a second auxiliary common line 182 are formed in the gate pad region GPA. Each of the first and second auxiliary common lines 150 and 182 is substantially parallel to the data line 140. Namely, each of the first and second auxiliary common lines 150 and 182 crosses the gate link line 113. The first auxiliary common line 150 has a first width along a direction of the gate line 110. The second auxiliary common line 182 overlaps the first auxiliary common line 150 and is electrically connected to the first auxiliary common line 150. The first auxiliary common line 150 is positioned between an end of the common line 118 and the gate pad electrode 122. The first width of the first auxiliary common line 150 is smaller than a distance between the end of the common line 118 and the gate pad electrode 122. Namely, the first auxiliary common line 150 is spaced apart from the common line 118 and the gate pad electrode 122.

The second auxiliary common line 182 includes a plurality of branches 184. The branch 184 overlaps the end of the common line 118. The branch 184 is electrically connected to the common line 118 through a first contact hole 164 exposing the end of the common line 118. Moreover, a third auxiliary common line 186 connecting the branches 184 is formed. A second contact hole 166 exposing a portion of the first auxiliary common line 150 may be formed. The second contact hole 166 may be spaced apart form and correspond one-to-one to the first contact hole 164. In this case, the first and second auxiliary common lines 150 and 182 are electrically connected to each other through the second contact hole 166. In addition, a third contact hole 167 corresponding to an end of each of the first and second auxiliary common lines 150 and 182 may be formed. The first and second auxiliary common lines 150 and 182 are also electrically connected to each other through the third contact hole 167. Although FIG. 4 shows both second and third contact holes 166 and 167, one of the first and second contact holes 166 and 167 may be omitted.

As mentioned above, a connection pattern corresponding to a common line is formed in the related art array substrate for an electrical connection between the common line and an auxiliary common line. However, in the present invention, the second auxiliary common line 182, which is electrically connected to the first auxiliary common line 150, is electrically connected to the common line 118 through the first contact hole 164. Moreover, by forming the third auxiliary common line 186 connecting the branches 184 of the second auxiliary common line 182, a problem resulted from a contact defect between the first and second auxiliary common lines 150 and 182 at the second contact hole 166 is overcome. Namely, even if there are contact defects at some second contact holes 166, an electrical connection between the second auxiliary common line 182 and the common line 118 is maintained due to the third auxiliary common line 186. Moreover, when not only the second contact hole 166 but also the third contact hole 167 are formed, even if there is a contact defect at the second contact hole 166, an electrical connection between the first and second auxiliary common lines 150 and 182 is also maintained due to the third contact hole 167. Accordingly, most electrical contact problems in the related art array substrate are overcome.

The first and second auxiliary common lines 150 and 182 have substantially the same shape to substantially perfectly overlap each other. The first and second auxiliary common lines 150 and 182 are electrically connected in parallel to each other through the second and third contact holes 166 and 167. Accordingly, even if a width of each of the first and second auxiliary common lines 150 and 182 is reduced, an increase of a resistance is mitigated. As a result, a problem resulted from a common voltage difference is also mitigated.

Figure 5:
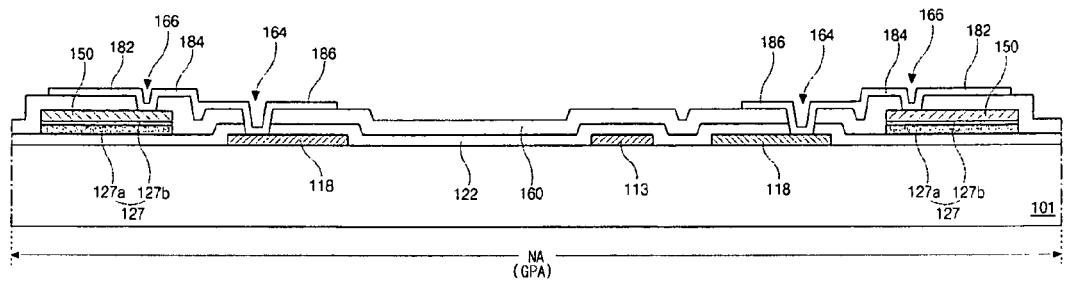
FIG. 5 is a cross-sectional view taken along the line V-V of FIG. 4.
Figure 6:
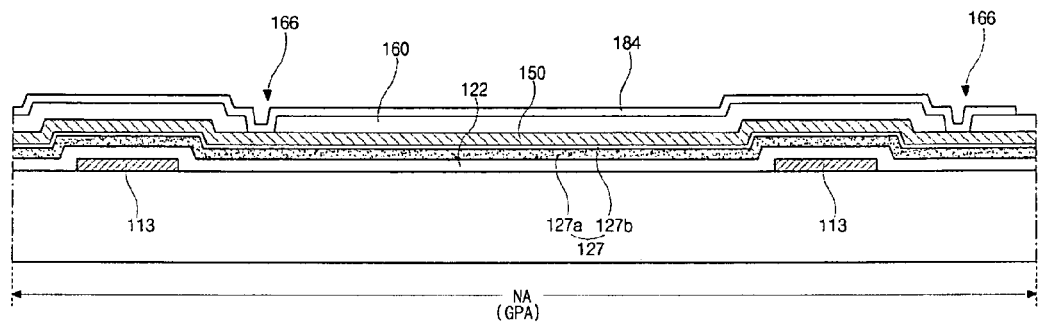
FIG. 6 is a cross-sectional view taken along the line VI-VI of FIG. 4.
Figure 7:
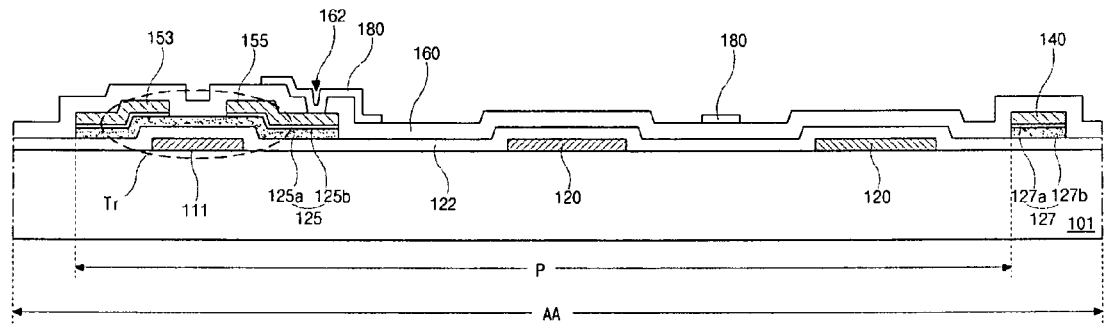
FIG. 7 is a cross-sectional view taken along the line VII-VII of FIG. 4.

FIG. 5 is a cross-sectional view taken along the line V-V of FIG. 4. FIG. 6 is a cross-sectional view taken along the line VI-VI of FIG. 4. FIG. 7 is a cross-sectional view taken along the line VII-VII of FIG. 4.

Referring to FIGS. 5 to 7, the gate line (not shown), the common line 118, the gate electrode 111 and the common electrode 120 are formed in the display region AA of the substrate 101. The common line 118 is substantially parallel to and spaced apart from the gate line. The gate electrode 111 extends from the gate line into the pixel region P. The common electrode 120 is connected to the common line 118 and includes the plurality of bars. The common electrode 120 is formed at the same layer and of the same material as the common line 118. However, the common electrode 120 may be formed at a different layer and of a different material than the common line 118. For example, the common electrode 120 may be formed at the same layer and of the same material as the pixel electrode 180.

The gate link line 113 connected to an end of the gate line is formed in the non-display region NA of the substrate 101. An end of the common line 118 extends into the non-display region NA. Namely, the end of the common line 118 is disposed in the non-display region NA. The gate pad electrode (not shown) is formed at one end of the gate link line 113. The gate link line 113 and the gate pad electrode are positioned in the gate pad region GPA.

A gate insulating layer 122 is formed on an entire surface of the substrate 101, where the gate line, the common line 118, the gate electrode 111, the common electrode 120, the gate link line 113 and the gate pad electrode are formed by depositing an inorganic insulating material. For example, the gate insulating layer 122 is formed of silicon nitride or silicon oxide.

The data line 140 is formed on the gate insulating layer 122 and in the display region AA. The data line 140 crosses the gate line to define the pixel region P. The semiconductor layer 125 including the active layer 125a and the ohmic contact layer 125b are formed on the gate insulating layer 122. The semiconductor layer 125 corresponds to the gate electrode 111. The source and drain electrodes 153 and 155, which are spaced apart from each other, are formed on the semiconductor layer 125. The source electrode 153 is connected to the data line 140. The gate electrode 111, the gate insulating layer 122, the semiconductor layer 125, the source electrode 153 and the drain electrode 155 constitute the TFT Tr.

The data link line (not shown) connected to an end of the data line 140 is formed on the gate insulating layer 122 and in the non-display region NA of the substrate 101. The data pad electrode (not shown) is formed on the gate insulating layer 122 and at one end of the data link line. The data link line and the data pad electrode are positioned in the data pad region. In addition, the first auxiliary common line 150 is formed on the gate insulating layer 122 and in the gate pad region GPA. The first auxiliary common line 150 crosses the gate link line 113. The first auxiliary common line 150 does not overlap the common line 118. Namely, the first auxiliary common line 150 is spaced apart from the common line 118.

In FIGS. 5 to 7, a semiconductor pattern 127 including first and second patterns 127a and 127b is disposed under each of the data line 140, the data link line, the data pad electrode and the first auxiliary common line 150. The first and second patterns 127a and 127b of the semiconductor pattern 127 are formed of the same material as the active layer 125a and the ohmic contact layer 125b, respectively. However, the semiconductor pattern 127 may be omitted depending on a fabricating method.

A passivation layer 160 is formed on an entire surface of the substrate 101, where the data line 140, the source and drain electrodes 153 and 155, the data link line, the data pad electrode and the first auxiliary common line 150 are formed, by depositing an inorganic insulating material or coating an organic insulating material. A drain contact hole 162 exposing a portion of the drain electrode 155 is formed through the passivation layer 160. In the non-display region NA, a first contact hole 164 exposing an end of the common line 118 is formed through the passivation layer 160, and a second contact hole 166 exposing a portion of the first auxiliary common line 150 and spaced apart from the first contact hole 164 is formed through the passivation layer 160 and the gate insulating layer 122. In FIG. 5, the second contact hole 166 is adjacent to the first contact hole 164. However, the second contact hole 166 may correspond to any portion of the first auxiliary common line 150. Although not shown, the third contact hole corresponding at least one end of the first auxiliary common line 150 may be formed through the passivation layer 160 and the gate insulating layer 122. One of the second contact hole 166 and the third contact hole (not shown) may be omitted.

Although not shown, a gate pad contact hole exposing the gate pad electrode is formed through the passivation layer 160 and the gate insulating layer 122, and a data pad contact hole exposing the data pad electrode is formed through the passivation layer 160. In addition, when the common electrode is formed at the different layer than the common line 118, a common contact hole exposing a portion of the common line is formed in each pixel region P and through the passivation layer 160 and the gate insulating layer 122.

The pixel electrode 180 including a plurality of bars is formed on the passivation layer 160 and in each pixel region P. The pixel electrode 180 contacts the drain electrode 155 through the drain contact hole 162. The bars of the pixel electrode 180 are alternately arranged with the bars of the common electrode 120. On the other hand, when the common electrode is not formed at the same layer as the common line 118, the common electrode contacting the common line 118 through the common contact hole is formed on the passivation layer 160. The common electrode on the passivation layer also includes a plurality of bars, and the bars of the common electrode are alternately arranged with the bars of the pixel electrode 180.

An gate pad electrode (not shown) contacting the gate pad electrode through the gate pad contact hole and an auxiliary data pad electrode (not shown) contacting the data pad electrode through the data pad contact hole are formed on the passivation layer 160 and in the non-display region NA. In addition, the second auxiliary common line 182 overlapping the first auxiliary common line 150 is formed on the passivation layer 160 and in the gate pad region GPA. As mentioned above, the second auxiliary common line 182 includes the branches 184. Each branch 184 corresponds to an end of the common line 118 and contacts the end of the common line 118 through the first contact hole 164. The branches extend from the second auxiliary common line 182. The second auxiliary common line 182 is electrically connected in parallel to the first auxiliary common line 150 by contacting the first auxiliary common line 150 through at least one of the second and third contact holes 184 and 186. Moreover, the third auxiliary common line 186 connecting the branches 184 is formed on the passivation layer 160.

Hereinafter, referring to FIGS. 8A to 8E, FIGS. 9A to 9E and FIGS. 10A to 10E, a fabricating method of an array substrate for an IPS mode LCD device according to the present invention is explained.

FIGS. 8A to 8E are cross-sectional view showing a fabricating process for a portion taken along the line V-V of FIG. 4. FIGS. 9A to 9E are cross-sectional view showing a fabricating process for a portion taken along the line VI-VI of FIG. 4. FIGS. 10A to 10E are cross-sectional view showing a fabricating process for a portion taken along the line VII-VII of FIG. 4.

Figure 8A:
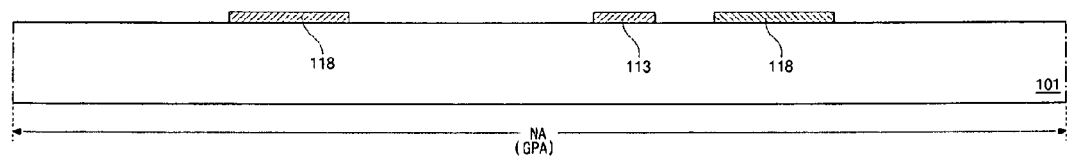
FIGS. 8A to 8E are cross-sectional view showing a fabricating process for a portion taken along the line V-V of FIG. 4.
Figure 9A:
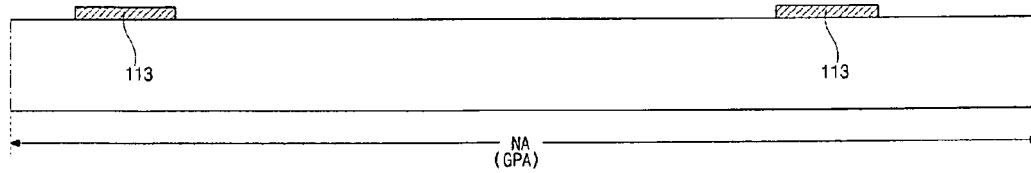
FIGS. 9A to 9E are cross-sectional view showing a fabricating process for a portion taken along the line VI-VI of FIG. 4.
Figure 10A:
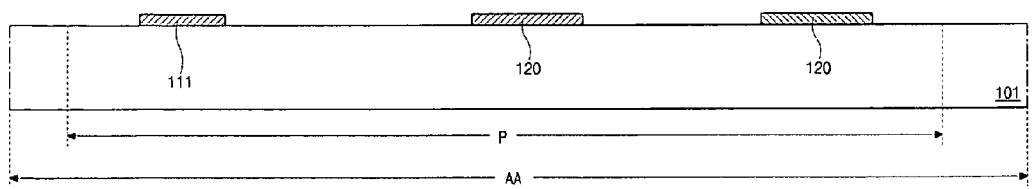
FIGS. 10A to 10E are cross-sectional view showing a fabricating process for a portion taken along the line VII-VII of FIG. 4.

Referring to FIGS. 8A, 9A and 10A, a first metallic material layer (not shown) is formed on the substrate 101 by depositing a first metallic material. The first metallic material may include one of aluminum (Al), Al alloy, copper (Cu), Cu alloy and chrome (Cr). The substrate 101 may be transparent. The first metallic material layer is patterned by a mask process to form the gate line (not shown), the common line 118, the gate electrode 111 and the common electrode 120 in the display region AA and the gate link line 113 and the gate pad electrode in the non-display region NA. The mask process includes a step of coating a photoresist (PR) layer on the first metallic material layer, a step of exposing the PR layer, a step of developing the exposed PR layer to form a PR pattern, a step of etching the first metallic material layer using the PR pattern and stripping the PR pattern. As mentioned above, the gate electrode 111 is connected to the gate line, and the common electrode 120 is connected to the common line 118. The common electrode 120 includes the plurality of bars. The gate link line 113 is connected to the gate line, and the gate pad is connected to the gate link line 113. An end of the common line 118 extends into the non-display region NA.

Figure 8B:
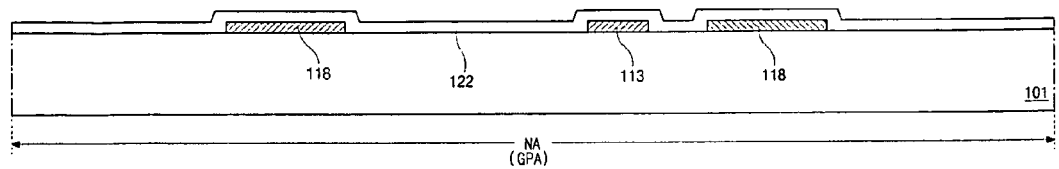
Figure 9B:
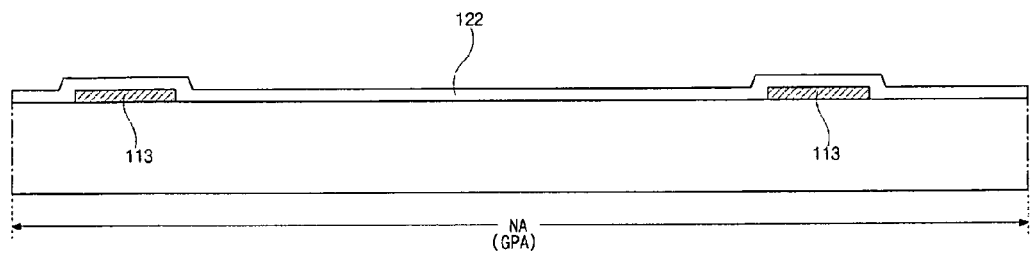
Figure 10B:
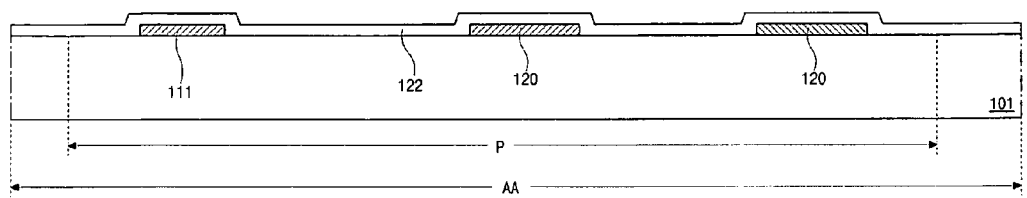

Next, referring to FIGS. 8B, 9B and 10B, the gate insulating layer 122 is formed on an entire surface of the substrate 101, where the gate line, the common line 118, the gate electrode 111, the common electrode 120, the gate link line 113 and the gate pad electrode are formed by depositing an inorganic insulating material. For example, the gate insulating layer 122 is formed of silicon nitride (SiNx) or silicon oxide ($SiO_2$).

Figure 8C:
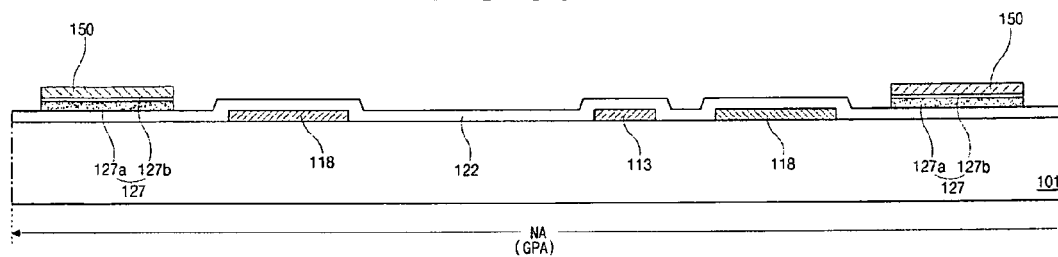
Figure 9C:
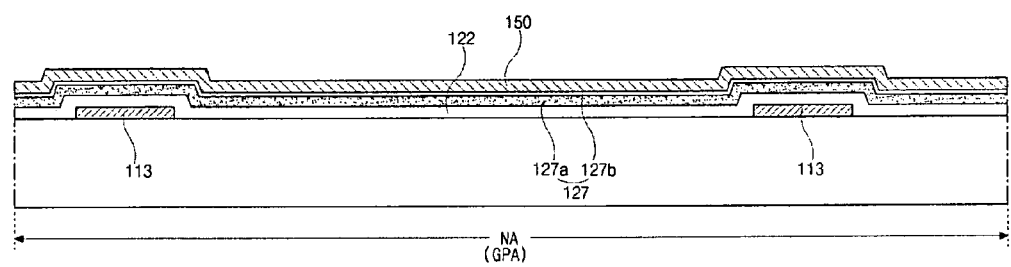
Figure 10C:
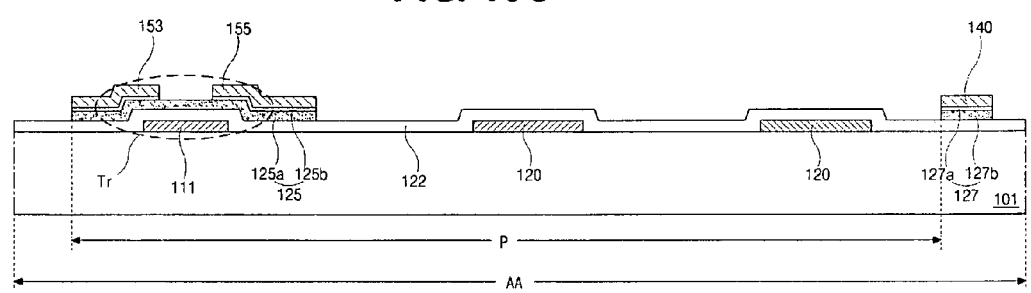

Next, referring to FIGS. 8C, 9C and 10C, intrinsic amorphous silicon, impurity-doped amorphous silicon and a second metallic material are sequentially deposited on the gate insulating layer 112 to form an intrinsic amorphous silicon layer (not shown), an impurity-doped amorphous silicon layer (not shown) and a second metallic material layer (not shown). Then, a PR material is coated on the second metal layer to form a first PR layer (not shown). The intrinsic amorphous silicon layer, an impurity-doped amorphous silicon layer and a second metallic material layer are patterned by a refractive exposing mask process or a half-tone exposing mask process to form the data line 140, the semiconductor layer 125 including the active layer 125a and the ohmic contact layer 125b, the source electrode 153 and the drain electrode 155 in the display region AA. The refractive exposing mask process or the half-tone exposing mask process uses a mask. The mask has a transmitting portion, a blocking portion and a half-transmitting portion. The transmitting portion has a relatively high transmittance so that light through the transmitting portion can completely change the PR layer chemically. The blocking portion shields light completely. The half-transmitting portion has a slit structure or a half-transmitting film so that the half-transmitting portion has a light transmittance smaller than that of the transmitting portion and greater than that of the blocking portion. The data line 140 crosses the gate line such that the pixel region P is defined. The semiconductor layer 125 corresponds to the gate electrode 111. The active layer 125a is formed of intrinsic amorphous silicon. The ohmic contact layer 125b is formed of impurity-doped amorphous silicon. The source and drain electrodes 153 and 155 are disposed on the semiconductor layer 125 and spaced apart from each other. The gate electrode 111, the gate insulating layer 122, the semiconductor layer 125, the source electrode 153 and the drain electrode 155 constitute the TFT Tr. In this case, the ohmic contact layer 125b is etched using the source and drain electrodes 153 and 155 as an etching mask such that a portion of the active layer 125a is exposed.

At the same time, the data link line (not shown) connected to an end of the data line 140 is formed on the gate insulating layer 122 and in the non-display region NA of the substrate 101. The data pad electrode (not shown) is formed on the gate insulating layer 122 and at one end of the data link line. The data link line and the data pad electrode are positioned in the data pad region. In addition, the first auxiliary common line 150 is formed on the gate insulating layer 122 and in the gate pad region GPA. The first auxiliary common line 150 crosses the gate link line 113. The semiconductor pattern 127 including first and second patterns 127a and 127b is disposed under each of the data line 140, the data link line, the data pad electrode and the first auxiliary common line 150. The first and second patterns 127a and 127b of the semiconductor pattern 127 are formed of the same material as the active layer 125a and the ohmic contact layer 125b, respectively. However, the semiconductor pattern 127 may be omitted depending on a fabricating method. Namely, if the second metallic material layer on the active layer and the ohmic contact layer is patterned by another mask process to form the data line, the source and drain electrodes, the data link line and the first auxiliary common line after the intrinsic amorphous silicon layer and the impurity-doped amorphous silicon layer deposited on the gate insulating layer are patterned by one mask process to form the active layer and the ohmic contact layer, the semiconductor layer may be not generated.

Figure 8D:
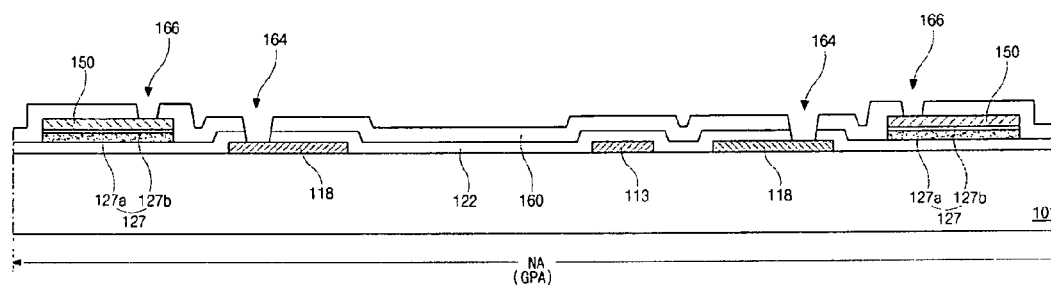
Figure 9D:
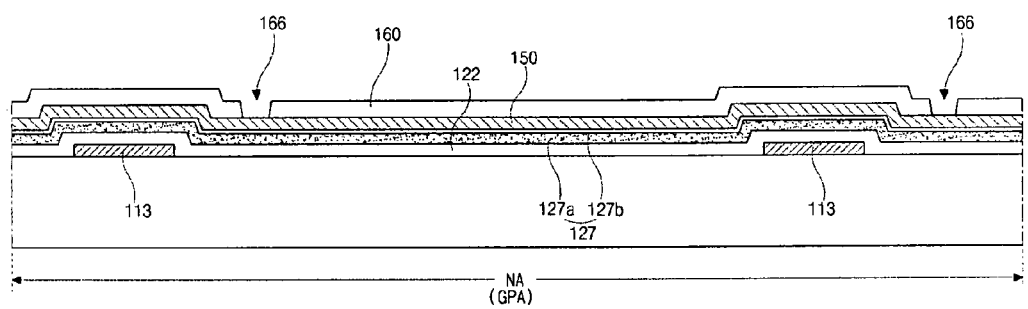
Figure 10D:
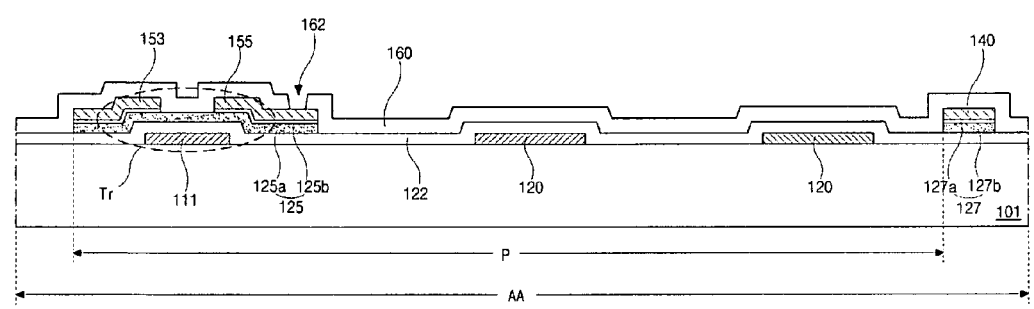

Next, referring to FIGS. 8D, 9D and 10D, an inorganic insulating material or coating an organic insulating material is deposited on an entire surface of the substrate 101, where the data line 140, the source and drain electrodes 153 and 155, the data link line, the data pad electrode and the first auxiliary common line 150 to form the passivation layer. For example, the inorganic insulating material may include one of silicon oxide and silicon nitride. The passivation layer 160 is patterned to form the drain contact hole 162 exposing a portion of the drain electrode 155. At the same time, in the non-display region NA, the first contact hole 164 exposing an end of the common line 118 is formed through the passivation layer 160, and the second contact hole 166 exposing a portion of the first auxiliary common line 150 and spaced apart from the first contact hole 164 is formed through the passivation layer 160 and the gate insulating layer 122. The third contact hole (not shown) corresponding at least one end of the first auxiliary common line 150 may be formed through the passivation layer 160 and the gate insulating layer 122. One of the second contact hole 166 and the third contact hole (not shown) may be omitted. Moreover, the gate pad contact hole exposing the gate pad electrode is formed through the passivation layer 160 and the gate insulating layer 122, and the data pad contact hole exposing the data pad electrode is formed through the passivation layer 160. In addition, when the common electrode is formed at the different layer than the common line 118, a common contact hole exposing a portion of the common line is formed in each pixel region P and through the passivation layer 160 and the gate insulating layer 122.

Figure 8E:
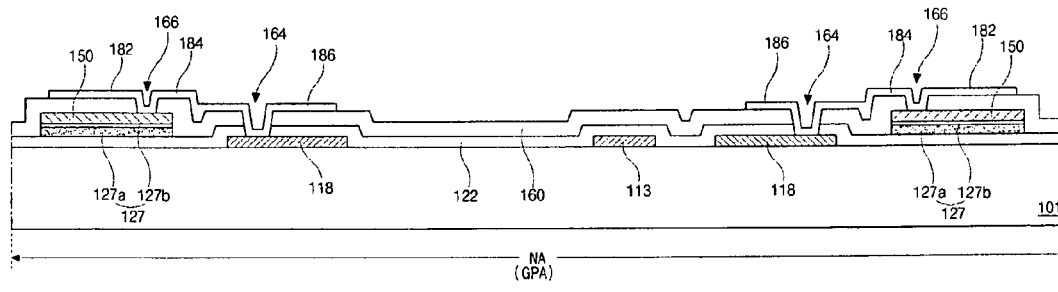
Figure 9E:
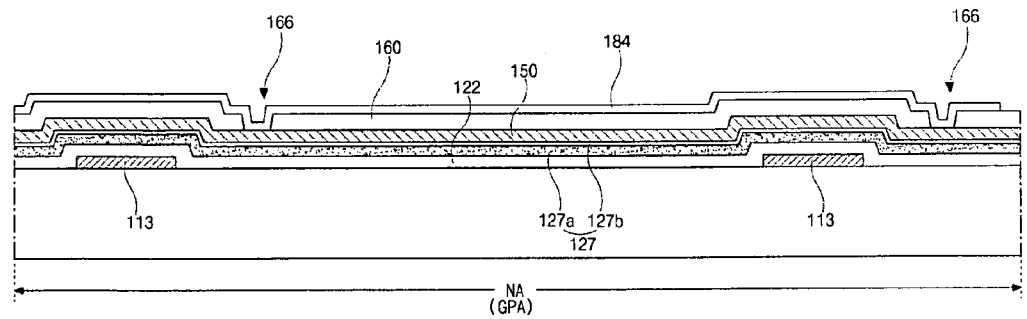
Figure 10E:
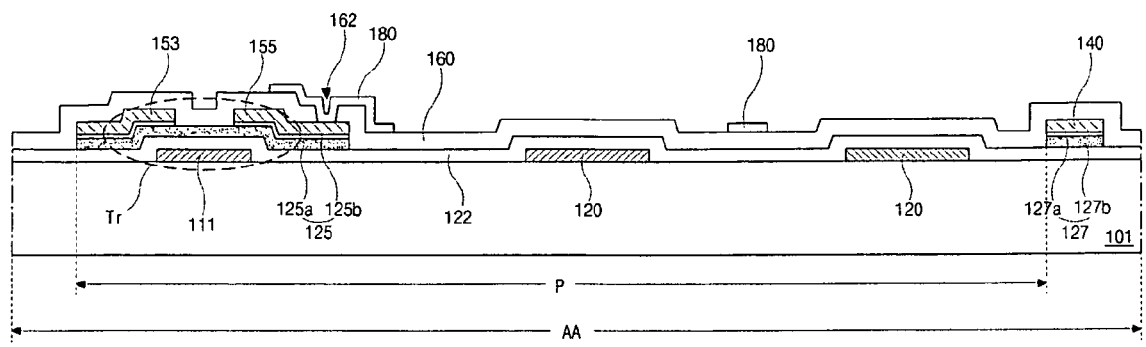

Next, referring to FIGS. 8E, 9E and 10E, a transparent conductive material is deposited on the passivation layer 160, where the first contact hole 164, the second contact hole 166, the third contact hole, the drain contact hole, the gate pad contact hole and the data pad contact hole are formed, to form a transparent conductive material layer (not shown). For example, the transparent conductive material may include one of indium-tin-oxide (ITO) and indium-zinc-oxide (IZO). The transparent conductive material layer is patterned by a mask process to form the pixel electrode 180 including a plurality of bars is formed on the passivation layer 160 and in each pixel region P. The pixel electrode 180 contacts the drain electrode 155 through the drain contact hole 162. The bars of the pixel electrode 180 are alternately arranged with the bars of the common electrode 120. At the same time, gate pad electrode (not shown) contacting the gate pad electrode through the gate pad contact hole and an auxiliary data pad electrode (not shown) contacting the data pad electrode through the data pad contact hole are formed on the passivation layer 160 and in the non-display region NA. In addition, the second auxiliary common line 182 overlapping the first auxiliary common line 150 is formed on the passivation layer 160 and in the gate pad region GPA. As mentioned above, the second auxiliary common line 182 includes the branches 184. Each branch 184 corresponds to an end of the common line 118 and contacts the end of the common line 118 through the first contact hole 164. The branches extend from the second auxiliary common line 182. The second auxiliary common line 182 is electrically connected in parallel to the first auxiliary common line 150 by contacting the first auxiliary common line 150 through at least one of the second and third contact holes 184 and 186. Moreover, the third auxiliary common line 186 connecting the branches 184 is formed on the passivation layer 160. On the other hand, when the common electrode is not formed at the same layer as the common line 118, the common electrode contacting the common line 118 through the common contact hole is formed on the passivation layer 160. The common electrode on the passivation layer also includes a plurality of bars, and the bars of the common electrode are alternately arranged with the bars of the pixel electrode 180.

It will be apparent to those skilled in the art that various modifications and variations can be made in the exemplary embodiments of the present invention without departing from the spirit or scope of the invention. Thus, it is intended that the invention cover the modifications and variations of this invention provided they come within the scope of the appended claims and their equivalents.

What is claimed is:

1. An array substrate for an in-plane switching mode liquid crystal display device, comprising:

a plurality of gate lines on a substrate including a display region and a non-display region at a periphery of the display region;

a plurality of common lines in the display region and parallel to the gate line, an end of each of the common lines disposed in the non-display region;

a plurality of gate link lines each connected to an end of each of the gate lines and disposed in the non-display region;

a gate insulating layer on the gate lines, the common lines and the gate link lines;

a plurality of data lines on the gate insulating layer and crossing the gate lines to define a plurality of pixel regions in the display region;

a first auxiliary common line on the gate insulating layer and in the non-display region, the first auxiliary common line crossing the gate link lines;

a passivation layer on the data lines and the first auxiliary common line, the passivation layer including a first contact hole exposing the end of each of the common lines and a second contact hole exposing a portion of the first auxiliary common line; and a second auxiliary common line on the passivation layer and overlapping the first auxiliary common line, the second auxiliary common line electrically connected to the first auxiliary common line through the second contact hole and each of the common lines though the first contact hole, wherein the second auxiliary common line has substantially the same shape as the first auxiliary common line.

2. The array substrate according to claim 1, further comprising:

a thin film transistor in each pixel region and connected to the gate and data lines, the thin film transistor including a gate electrode on the substrate, the semiconductor layer on the gate insulating layer and the source and drain electrode on the semiconductor layer;

a pixel electrode connected to the drain electrode of the thin film transistor and including a plurality of bars;

a common line connected to the common line and including a plurality of bars; and a plurality of data link lines each connected to an end of each of the data line, wherein the bars of the pixel electrode are alternately arranged with the bars of the common electrode.

3. The array substrate according to claim 2, wherein the common electrode is formed at the same layer as one of the common line and the pixel electrode.

4. The array substrate according to claim 2, wherein the pixel electrode is formed on the passivation layer and of a transparent conductive material.

5. The array substrate according to claim 4, wherein the second auxiliary common line is formed of the same material as the pixel electrode.

6. The array substrate according to claim 2, further comprising:

a data pad electrode on the gate insulating layer and connected to the data link line; and an auxiliary data pad electrode on the passivation layer and electrically connected to the data pad electrode.

7. The array substrate according to claim 1, wherein the second auxiliary common line includes a plurality of branches, wherein each branch extends from the second auxiliary common line to the end of each of the common line and connected to the each of the common lines through the first contact hole.

8. The array substrate according to claim 7, further comprising a third auxiliary common line connecting the plurality of branches.

9. The array substrate according to claim 1, wherein the passivation layer further includes a third contact hole exposing an end of the first auxiliary common line such that the second auxiliary common line electrically connected to the first auxiliary common line through the third contact hole.

10. The array substrate according to claim 1, wherein the first auxiliary common line is formed of the same material as the data line.

11. The array substrate according to claim 1, further comprising:

a gate pad electrode on the substrate and connected to the gate link line; and an auxiliary gate pad electrode on the passivation layer and electrically connected to the gate pad electrode.

12. The method according to claim 1, wherein the passivation layer further includes a third contact hole exposing an end of the first auxiliary common line such that the second auxiliary common line electrically connected to the first auxiliary common line through the third contact hole.

13. The method according to claim 1, wherein the step of gate line includes forming a gate pad electrode on the substrate and connected to the gate link line and the step of forming the second auxiliary common line includes forming an auxiliary gate pad electrode on the passivation layer and electrically connected to the gate pad electrode.

14. A method of fabricating an array substrate for an in-plane switching mode liquid crystal display device, comprising:

forming a plurality of gate lines, a plurality of common lines and a plurality of gate link lines on a substrate including a display region and a non-display region at a periphery of the display region, the plurality of common lines in the display region and parallel to the gate line, an end of each of the common lines disposed in the non-display region, the plurality of gate link lines each connected to an end of each of the gate lines and disposed in the non-display region;

forming a gate insulating layer on the gate lines, the common lines and the gate link lines;

forming a plurality of data lines and a first auxiliary common line on the gate insulating layer, the data lines crossing the gate lines to define a plurality of pixel regions in the display region, the first auxiliary common line in the non-display region and the first auxiliary common line crossing the gate link lines;

forming a passivation layer on the data lines and the first auxiliary common line, the passivation layer including a first contact hole exposing the end of each of the common lines and a second contact hole exposing a portion of the first auxiliary common line; and forming a second auxiliary common line on the passivation layer and overlapping the first auxiliary common line, the second auxiliary common line electrically connected to the first auxiliary common line through the second contact hole and each of the common lines though the first contact hole, wherein the second auxiliary common line has substantially the same shape as the first auxiliary common line.

15. The method according to claim 14, wherein the step of forming the gate line includes forming a gate electrode connected to the gate line, the step of forming the data line includes forming a semiconductor layer corresponding to the gate electrode, forming source and drain electrodes on the semiconductor layer and spaced apart from each other and forming a data link line connected to the data line, and the step of forming the second auxiliary common line include forming a pixel electrode in each pixel region and connected to the drain electrode, wherein the pixel electrode includes a plurality of bars.

16. The method according to claim 15, wherein one of the step of forming the gate line and the step of forming the second auxiliary common line further includes forming a common electrode connected to the common line and including a plurality of bars, wherein the bars of the pixel electrode are alternately arranged with the bars of the common electrode.

17. The method according to claim 15, wherein each of the pixel electrode and the second auxiliary common line is formed of a transparent conductive material.

18. The method according to claim 15, wherein the step of forming the data line further includes forming a data pad electrode connected to the data link line and the step of forming the second auxiliary common line further includes forming an auxiliary data pad electrode connected to the data pad electrode.

19. The method according to claim 14, wherein the second auxiliary common line includes a plurality of branches, wherein each branch extends from the second auxiliary common line to the end of each of the common line and connected to the each of the common lines through the first contact hole.

20. The method according to claim 19, wherein the step of forming the second auxiliary common line includes forming a third auxiliary common line connecting the plurality of branches.

* * * * *